(12) United States Patent
Stiesdal et al.

(10) Patent No.: US 9,142,969 B2
(45) Date of Patent: Sep. 22, 2015

(54) SYSTEM TO STORE AND TO TRANSMIT ELECTRICAL POWER

(75) Inventors: Henrik Stiesdal, Odense (DK); Erik Wolf, Röttenbach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 692 days.

(21) Appl. No.: 13/497,549

(22) PCT Filed: Sep. 10, 2010

(86) PCT No.: PCT/EP2010/063316
§ 371 (c)(1),
(2), (4) Date: Mar. 22, 2012

(87) PCT Pub. No.: WO2011/039045
PCT Pub. Date: Apr. 7, 2011

(65) Prior Publication Data
US 2012/0175949 A1 Jul. 12, 2012

(30) Foreign Application Priority Data
Sep. 30, 2009 (EP) .................................. 09012402

(51) Int. Cl.
*B60L 1/00* (2006.01)
*H02J 1/00* (2006.01)
(Continued)

(52) U.S. Cl.
CPC ... *H02J 4/00* (2013.01); *H02J 3/02* (2013.01); *H02J 3/30* (2013.01); *Y02E 60/16* (2013.01); *Y10T 307/25* (2015.04); *Y10T 307/305* (2015.04); *Y10T 307/344* (2015.04)

(58) Field of Classification Search
CPC ................. H02J 4/00; H02J 3/30; H02J 3/02; Y10T 307/344; Y10T 307/305; Y10T 307/25; Y02E 60/16
USPC ...................................... 307/9; 361/62, 67, 68
See application file for complete search history.

(56) References Cited

U.S. PATENT DOCUMENTS 5,929,537 A   7/1999 Glennon
5,973,899 A * 10/1999 Williams et al. ................. 361/72
(Continued)

FOREIGN PATENT DOCUMENTS

CN   1769093 A   5/2006
CN   101104387 A   1/2008
(Continued)

OTHER PUBLICATIONS

H. Tao et al., "Family of multiport bidirectional DC-DC converters", IEEE Proc.-Electr. Power Appl., vol. 153, No. 3, May 2006, pp. 451-458.*
(Continued)

*Primary Examiner* — Jared Fureman
*Assistant Examiner* — Emmanuel R Dominique

(57) ABSTRACT

A system to store and to transmit electrical power includes at least one storage system, at least one bidirectional converter, and at least one load coupled to a network, wherein the load is adapted to both, receive electrical power from the network and supply electrical power to the network. A first storage system is used to store electrical power of a power source. The first storage system is connected to a first bidirectional converter by a DC power transmission system. The first bidirectional converter is connected to an AC network and the AC network is connected to a first load.

16 Claims, 3 Drawing Sheets

(51) Int. Cl.
  *H02J 3/00* (2006.01)
  *H02J 9/00* (2006.01)
  *H02J 4/00* (2006.01)
  *H02J 3/02* (2006.01)
  *H02J 3/30* (2006.01)

(56) References Cited

U.S. PATENT DOCUMENTS

| | | | |
|---|---|---|---|
| 6,787,933 B2* | 9/2004 | Claude et al. | 290/52 |
| 7,117,044 B2* | 10/2006 | Kocher et al. | 700/34 |
| 7,923,857 B2* | 4/2011 | Langlois et al. | 307/9.1 |
| 8,244,419 B2* | 8/2012 | Wegner-Donnelly et al. | 701/21 |
| 2003/0227276 A1* | 12/2003 | Agbossou et al. | 320/112 |
| 2004/0053093 A1* | 3/2004 | Colborn et al. | 429/23 |
| 2005/0099138 A1 | 5/2005 | Wilhelm | |
| 2005/0127880 A1 | 6/2005 | Colley | |
| 2007/0114954 A1* | 5/2007 | Hampo et al. | 318/105 |
| 2007/0219755 A1 | 9/2007 | Hennessy et al. | |
| 2009/0027932 A1* | 1/2009 | Haines et al. | 363/95 |
| 2009/0040029 A1* | 2/2009 | Bridges et al. | 340/310.11 |
| 2009/0134717 A1 | 5/2009 | Marks | |
| 2009/0195074 A1 | 8/2009 | Buiel | |
| 2010/0017045 A1* | 1/2010 | Nesler et al. | 700/296 |
| 2010/0136379 A1* | 6/2010 | King et al. | 429/23 |

FOREIGN PATENT DOCUMENTS

| | | |
|---|---|---|
| CN | 101119026 A | 2/2008 |
| FR | 2907762 A1 | 5/2008 |
| WO | WO 03030341 A2 | 4/2003 |
| WO | WO2009/155445 A2 * | 6/2009 |

OTHER PUBLICATIONS

Leonhard W.; "Electrical Engineering between Energy and Information"; Power Electronics and Motion Control Conference, 2000 Piscataway, The Third International Aug. 15-18, 2000, PI MC; vol. 1; pp. 197-202; ISBN: 978-7-80003-484-0 XP010522842; 2000; US; Aug. 15, 2000.

Ibrahim et al; "Energy storage systems—Characteristics and comparisons"; Renewable and sustainable energy reviews, Elseviers Science; vol. 12; No. 5; pp. 1221-1250; ISSN: 1364-0321; DOI: 10.1016/J.RSER.2007.01.023; XP022759453; 2008; US; Jun. 1, 2008.

* cited by examiner

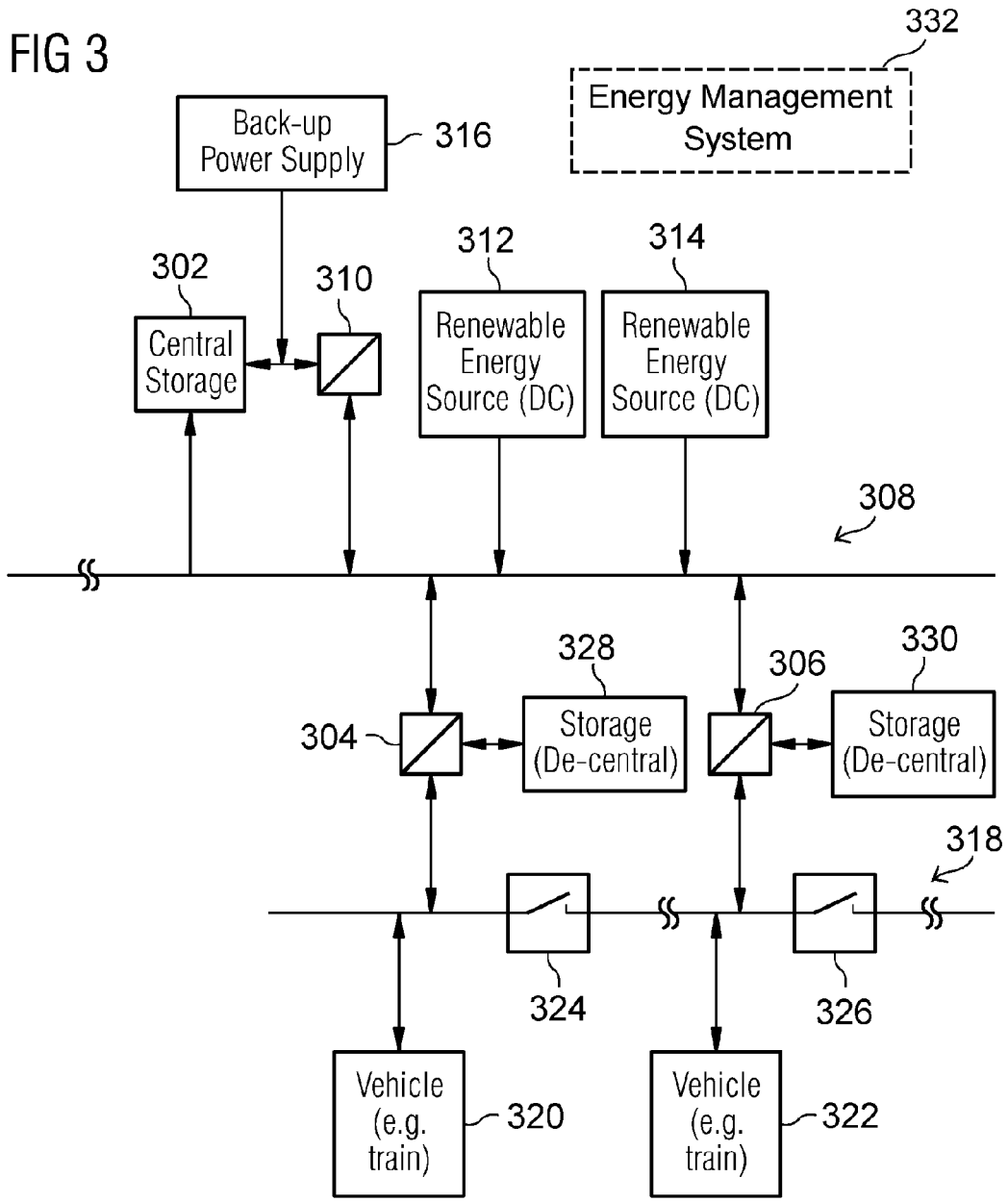

SYSTEM TO STORE AND TO TRANSMIT ELECTRICAL POWER

CROSS REFERENCE TO RELATED APPLICATIONS

This application is the US National Stage of International Application No. PCT/EP2010/063316, filed Sep. 10, 2010 and claims the benefit thereof. The International Application claims the benefits of European application No. 09012402.5 EP filed Sep. 30, 2009. All of the applications are incorporated by reference herein in their entirety.

FIELD OF THE INVENTION

The present invention relates to an energy storage and transmission system, in particular a DC transmission system.

BACKGROUND OF THE INVENTION

Transportation systems are often expected to overcome long distances and to cross areas where suitable power generation systems are not available. Direct current (DC) transmission is a suitable transmission method for economic power transmission over such long distances.

DC transmission systems are known for energy transfer between two remote systems. Thereby, a first converter station is usually located close to the power generation unit at one end of a DC transmission line and a second converter station is located at the other end of the DC transmission line in the load center.

Some more sophisticated DC transmission systems comprise bidirectional converter stations and allow for controlling the current flow direction through the bidirectional converter stations.

Worldwide transportation produces a huge amount of carbon dioxid emissions and thus has a negative impact on the environment. It is therefore desirable to provide transportation systems, especially railway vehicles, with energy from renewable energy sources.

However, transportation systems have to be highly reliable. Renewable energy sources, on the contrary, are intermittent and their energy output quantity fluctuates.

Besides, the power demand of transportation systems usually fluctuates too because the vehicles start and stop regularly.

It is therefore the object of the present invention to provide an energy storage and transmission system which allows for compensating fluctuations of energy supply and demand.

This object is achieved by means of the independent claim. Advantageous features are defined in the dependent claims. Further objects and advantages are apparent in the following detailed description.

SUMMARY OF THE INVENTION

The present invention discloses a system to store and to transmit electrical power, comprising at least one storage system, at least one bidirectional converter, at least one load coupled to a network, wherein the load is adapted to both, receive electrical power from the network and supply electrical power to the network, wherein a first storage system is used to store electrical power of a power source, wherein the first storage system is connected to a first bidirectional converter by a DC power transmission system, wherein the first bidirectional converter is connected to an AC network and wherein the AC network is connected to a first load.

The system according to the invention incorporates at least one energy storage to compensate energy output variations of at least one energy source. It thus renders possible the use of energy sources with fluctuating energy output for applications requiring an unvarying energy supply.

Thereby, the system according to the invention enables the use of renewable energy sources, e.g. solar or wind power plants, for these applications without requiring a national or regional grid acting as energy storage.

Applications requiring an unvarying energy supply comprise transport systems. Thus, the system according to the invention allows for climate-friendly energy supply of transportation systems, for example railway systems.

Advantageously, the system according to the invention allows for bidirectional energy flows. A load not only consumes energy, it may also feed back energy into the system.

It is a further advantage of the present invention that energy feeded in by the load may not only be stored locally, but may also be transferred to the DC transmission system and from the DC transmission system to another storage.

BRIEF DESCRIPTION OF THE DRAWINGS

Embodiments of the present invention will now be described, by way of example, with reference to the accompanying drawings in which:

FIG. 3: shows a storage and transmission system with several power sources and a central storage wherein the power sources and the storage are connected to the DC transmission system As shown in FIG. 1 the system according to the invention comprises a central storage system 101. The central storage system is connected to a power source system 104 and is used to store electrical power which allows for compensating energy output variations of the power source system.

Figure 1:
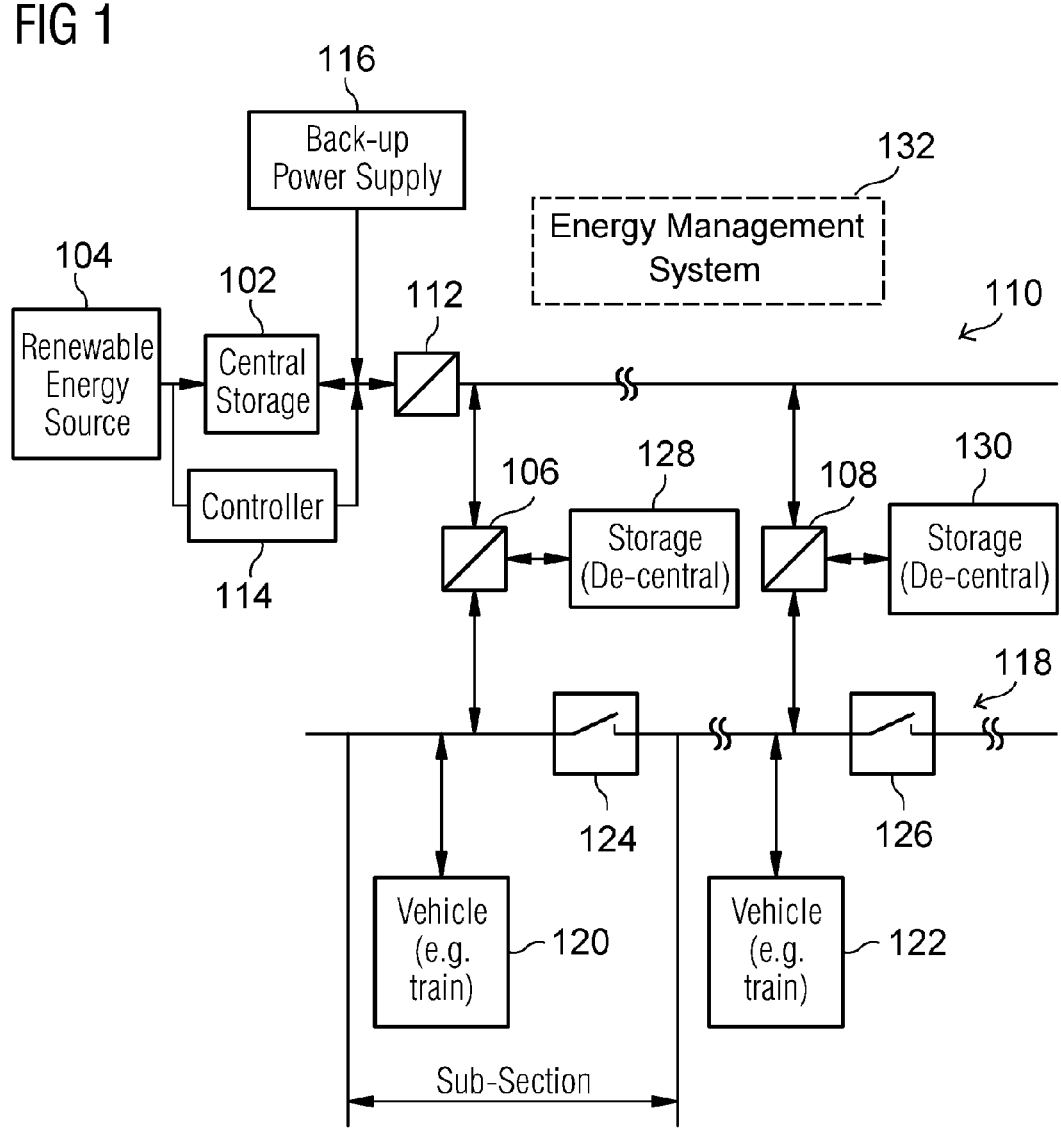
FIG. 1: shows a storage and transmission system with a power source connected to the sending end of a DC transmission system through a central storage

The power source system 104 comprises either a single power source or several power sources wherein the several power sources are managed in conjunction. Preferably, the power source system comprises renewable power sources like wind or solar power plants.

The aformentioned central storage system 102 is furthermore connected to bidirectional converter stations 106, 108 by a High Voltage Direct Current power transmission system 110 hereinafter called HVDC transmission system. The HVDC transmission system allows for economic power transmission over long distances and for fast control of power flows, not only for the HVDC link but also for surrounding electrical systems.

The central storage system 102 is connected to the HVDC transmission system 110 through an AC/DC or DC/DC converter station 112 and comprises a hydrogen storage, a molten salt storage or a pumped hydro storage. Besides, a controller 114 is connected to the central storage system 102.

In addition, a back-up power source 116 is connected to the HVDC transmission system through the converter station 112 for compensating variations of the renewable power source system. The backup power source comprises one or more AC or DC power sources and the converter station 112 comprises an AC/DC converter or a DC/DC converter, respectively.

The above-mentioned bidirectional converter stations 106, 108, are connected to an AC supply network 118 and loads 120, 122 are coupled to that AC supply network 118. By way of example these loads are railway vehicles.

The railway vehicles are adapted to both, receive electrical power from the AC supply network and provide electrical power to the AC supply network.

As further shown in FIG. 1, the AC supply network comprises switches 124, 126 which allow for segmenting the AC supply network into sub-sections. The sub-sections can be powered independently. Thus only the sub-sections on which a railway vehicle is present could be provided with power.

Thereby, the switches or sub-section interrupters 124, 126 are used to couple the first converter station 106 and the associated first load 120 to the second converter station 108 and the associated second load 122 or to decouple the first converter station 106 and the associated first load 120 from the second converter station 108 and the associated second load 122.

The bidirectional converter stations 106, 108 comprise DC/AC converters. By means of the bidirectional converter stations, on the one hand, power is fed into the AC supply network for example to accelerate a railway vehicle or to maintain the vehicles speed, on the other hand, power is harvested from the AC supply network for example during deceleration of a railway vehicle.

Decentral energy storage units 128, 130 are either connected to or integrated into these bidirectional converter stations 106, 108 to absorb electrical power. Power stored in the decentral storage units 128, 130 can be provided to the railway vehicle. The decentral storage units 128, 130 may comprise an electro-chemical storage (e.g. battery), an electrical storage (e.g. super cap), a mechanical storage (e.g. flywheel energy storage) or any combination thereof.

Energy harvested from the AC supply network may also be fed back to the HVDC transmission system and from the HVDC transmission system to the central storage 102. Therefore converter 112 can be a bidirectional converter.

In addition, the storage system 112, 128, 130 and/or the bidirectional converter 106, 108 and/or the load 120, 122 and/or the switch 124, 126 and/or the network is connected with an energy management system 132, which controls energy flows within the system. It further may control the movement of the load 120, 122 and the switching operation of the switch 124, 126.

Figure 2:
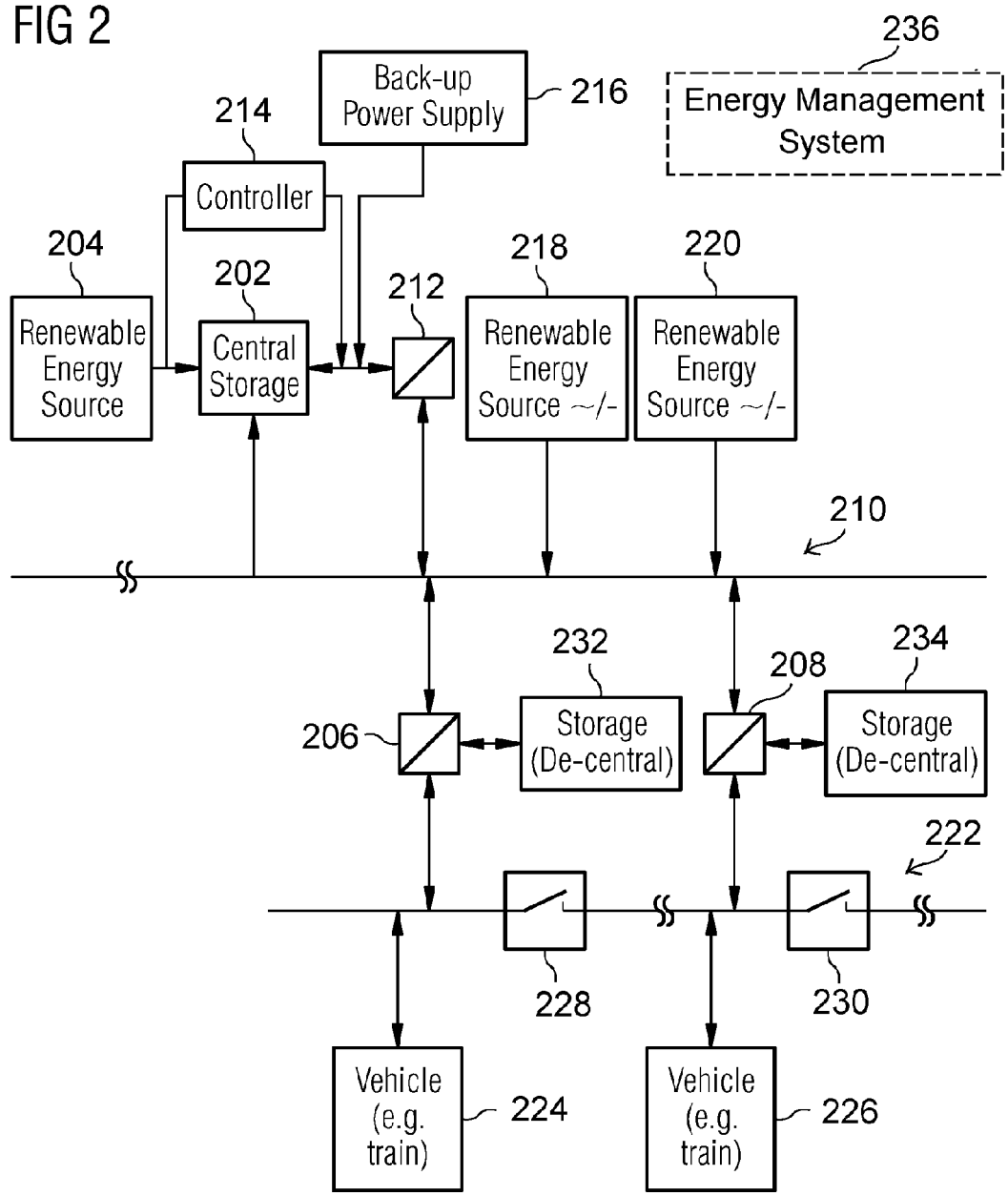
FIG. 2: shows a storage and transmission system with power sources connected either directly or through a central storage to the DC transmission system

In an alternate embodiment shown in FIG. 2 further power source systems are connected to the system in addition to the main power source.

As shown in FIG. 2, the system comprises a central storage system 202 which is connected to a power source system 204.

That power source system 204 comprises either a single power source or several power sources wherein the several power sources are managed in conjunction. Preferably, the power source system 204 comprises renewable power sources like wind or solar power plants.

The aforementioned central storage system 202 is connected to bidirectional converter stations 206, 208 by an HVDC transmission system 210. Thereby, the central storage system 202 is connected to the HVDC transmission system 210 directly as well as through an AC/DC or DC/DC converter station 212. The central storage system 202 comprises a hydrogen storage and/or a molten salt storage and/or a pumped hydro storage. Besides, a controller 214 is connected to the central storage system 202.

Moreover, a back-up power source 216 is connected to the HVDC transmission system through the converter station 212 for compensating variations of the renewable power source system. The backup power source may comprise one or more AC or DC sources and the converter station 212 comprises an AC/DC converter or a DC/DC converter, respectively.

The embodiment of the invention shown in FIG. 2, comprises, in addition to the main and backup power sources 204 and 216, further power source systems 218, 220 which are connected to the HVDC transmission system 210. The further power source systems can be located decentrally and may comprise either a single power source or several power sources wherein the several power sources are managed in conjunction. The power source systems 218, 220 may also comprise renewable power sources.

The above-mentioned bidirectional converter stations 206, 208 are connected to an AC supply network 222 and loads 224, 226 are coupled to the AC supply network 222. By way of example the loads are railway vehicles.

The railway vehicles are adapted to both, receive electrical power from the AC supply network 222 and provide electrical power to the AC supply network 222.

As further shown in FIG. 2, the AC supply network 222 comprises switches 228, 230 which allow for segmenting the AC supply network into sub-sections. The sub-sections can be powered independently. Thus only the sub-sections on which a railway vehicle is present could be provided with power.

Thereby, the switches or sub-section interrupters 228, 230 are used to couple the first converter station 206 and the associated first load 224 to the second converter station 208 and the associated second load 226 or to decouple the first converter station 206 and the associated first load 224 from the second converter station 208 and the associated second load 226.

The bidirectional converter stations 206, 208 comprise DC/AC converters. By means of these bidirectional converter stations, on the one hand, power is fed into the AC supply network for example to accelerate a railway vehicle or to maintain the vehicles speed, on the other hand, power is harvested from the AC supply network for example during deceleration of a railway vehicle.

Decentral energy storage units 232, 234 are either connected to or integrated into these bidirectional converter stations 206, 208 to absorb electrical power. Power stored in the decentral storage units 232, 234 can be provided to the railway vehicles. The decentral storage units 232, 234 may comprise an electro-chemical storage (e.g. battery), an electrical storage (e.g. super cap), a mechanical storage (e.g. flywheel energy storage) or any combination thereof.

Energy harvested from the AC supply network 222 may also be fed back to the HVDC transmission system 210 and from the HVDC transmission system to the central storage system 202. Therefore the central storage system is directly connected to the HVDC transmission system and converter 212 is adapted to allow for bidirectional energy flows.

In addition, the storage system 202, 232, 234 and/or the converter 212, 206, 208 and/or the load 224, 226 and/or the switch 228, 230 and/or the network is connected to an energy management system 236, which controls energy flows within the system. It further may control the movement of the load 224, 226 and the switching operation of the switch 228, 230.

In a further alternate embodiment shown in FIG. 3, the power source systems are located decentrally.

As shown in FIG. 3, a central storage system 302 is again connected to bidirectional converter stations 304, 306 by an HVDC transmission system 308.

Thereby, the central storage system 302 is connected to the HVDC transmission system directly as well as through an AC/DC or DC/DC converter 310. It comprises a hydrogen storage and/or a molten salt storage and/or a pumped hydro storage.

The embodiment shown in FIG. 3, comprises power source systems 312, 314, which are connected to the HVDC transmission system 308. As aforementioned, these and further power source systems may be located decentrally. They are adapted to provide energy to the central storage system 302.

The power source systems 312, 314 comprise either a single power source or several power sources wherein the several power sources are managed in conjunction. Preferably, the power sources 312, 314 comprise renewable power sources like wind or solar power plants.

In addition, a back-up power source 316 is connected to the DC HVDC transmission system 308 through the converter station 310. The backup power source may comprise one or more AC or DC power sources and the converter station 310 comprises an AC/DC converter or a DC/DC converter, respectively.

The bidirectional converter stations 304, 306 are connected to an AC supply network 318. The loads 320, 322 are coupled to that AC supply network 318. By way of example these loads are railway vehicles.

The railway vehicles are adapted to both, receive electrical power from the AC supply network and provide electrical power to that AC supply network.

As further shown in FIG. 3, the AC supply network comprises switches 324, 326 which allow for segmenting the AC supply network into sub-sections. The sub-sections may be powered independently. Thus only the sub-sections on which a railway vehicle is present could be provided with power.

Thereby, the switches or sub-section interrupters 324, 326 are used to couple the first converter station 304 and the associated first load 320 to the second converter station 306 and the associated second load 322 or to decouple the first converter station 304 and the associated first load 320 from the second converter station 306 and the associated second load 322.

The bidirectional converter stations 304, 306 comprise DC/AC converters. By means of these bidirectional converter stations, on the one hand, power is feeded into the AC supply network for example to accelerate a railway vehicle or to maintain the vehicles speed, on the other hand, power is harvested from the AC supply network for example during deceleration of a railway vehicle.

Decentral energy storage units 328, 330 are either connected to or integrated into these bidirectional converter stations 304, 306 to absorb electrical power. Power stored in the decentral storage units can be provided to the railway vehicle. The decentral storage units may comprise an electrochemical storage (e.g. battery), an electrical storage (e.g. super cap), a mechanical storage (e.g. flywheel energy storage) or any combination thereof.

Energy harvested from the AC supply network may also be fed back to the HVDC transmission system and from the HVDC transmission system to the central storage 302. Therefore the central storage system is directly connected to the HVDC transmission system and converter 310 is adapted to allow for bidirectional energy flows.

In addition, the storage system 302, 312, 314 and/or the converter 310, 304, 306 and/or the load 320, 322 and/or the switch 324, 326 and/or the network 318 is connected with an energy management system 332, which controls energy flows within the system. It further may control the movement of the load 320, 322 and the switching operation of the switch 324, 326.

The invention claimed is:

1. A system to store and to transmit electrical power, comprising
    a storage system comprising a central storage system used to store electrical power of at least one power source,
    an HVDC power transmission system to which the central storage system is connected,
    a first bidirectional converter connected at one side to the HVDC power transmission system,
    at least one an AC network connected to another side of the first bidirectional converter,
    a first load connected to the AC network and adapted to both, receive electrical power from the AC network and supply electrical power to the AC network,
    a second bidirectional converter connected at one side to the HVDC power transmission system and at another side to the AC network, and
    a second load connected to the AC network and adapted to both, receive electrical power from the AC network and supply electrical power to the AC network;
    wherein the AC network comprises a switch being used either to couple the first bidirectional converter and the first load to the second bidirectional converter and the second load or to decouple the first bidirectional converter and the first load from the second bidirectional converter and the second load.

2. The system according to claim 1, wherein each of the first and the second loads is a vehicle.

3. The system according to claim 2, wherein the vehicle is a railway vehicle.

4. The system according to claim 1, wherein the central storage system is connected to the HVDC transmission system directly.

5. The system according to claim 1, wherein the central storage system is connected to the HVDC transmission system through an AC/DC converter or through a DC/DC converter.

6. The system according to claim 5, wherein the AC/DC converter or the DC/DC converter is a bidirectional converter.

7. The system according to claim 1, wherein the central storage system comprises at least one element selected from the group consisting of: a hydrogen storage, a molten salt storage, and a pumped hydro storage.

8. A system to store and to transmit electrical power, comprising:
    at least one storage system comprising a central storage system,
    at least one bidirectional converter comprising a first bidirectional converter,
    at least one load coupled to an AC network and adapted to both, receive electrical power from the AC network and supply electrical power to the AC network, wherein the at least one load comprises a first load,
    wherein the central storage system is used to store electrical power of a power source,
    wherein the central storage system is connected to the first bidirectional converter by a HVDC power transmission system,
    wherein the first bidirectional converter is connected to the AC network,
    wherein the AC network is connected to the first load,
    wherein the at least one storage system further comprises a decentral storage system, and
    wherein the decentral storage system is connected to the AC network through one of that bidirectional converters.

9. The system according to claim 8, wherein the decentral storage system is connected to the HVDC transmission system through one of that bidirectional converters and over that HVDC transmission system to the central storage system.

10. The system according to claim 8, wherein the decentral storage system comprises an electro-chemical, an electrical or a mechanical storage.

11. The system according to claim 1, wherein a controller is connected to the at least one storage system.

12. The system according to claim 1, wherein an energy management system adapted to control energy flows is connected with at least one element from the group consisting of: the at least one storage system, the at least one converter, the at least one load, a switch, and the AC network.

13. The system according to claim 12, wherein the energy management system is adapted to control at least one of:
   the movement of the at least one load, and
   a switching operation of the switch for selectively powering a sub-section of the network.

14. The system according to claim 1, wherein the power source comprises at least one power source system which is connected to the HVDC transmission system.

15. The system according to claim 14, wherein the power source system comprises renewable power sources selected from the group consisting of: wind power sources, solar power sources and hydro power sources.

16. The system according to claim 15, wherein the power source system comprises at least one back-up power source is connected to the HVDC transmission system for compensating variations of the renewable power source.

* * * * *